(12) United States Patent  
Chong et al.

(10) Patent No.: US 9,123,149 B2  
(45) Date of Patent: Sep. 1, 2015

(54) EXPERT COLOR SYSTEM FOR COLOR SELECTION WITH COLOR HARMONY AND COLOR EMOTION INTELLIGENCE

(71) Applicant: Columbia Insurance Company, Omaha, NE (US)

(72) Inventors: Patrick Tak Fu Chong, Mount Arlington, NJ (US); Hugh Fairman, Stillwater, NJ (US)

(73) Assignee: Columbia Insurance Company, Omaha, NE (US)

( * ) Notice: Subject to any disclaimer, the term of this patent is extended or adjusted under 35 U.S.C. 154(b) by 248 days.

(21) Appl. No.: 13/833,861

(22) Filed: Mar. 15, 2013

(65) Prior Publication Data

US 2014/0267367 A1     Sep. 18, 2014

(51) Int. Cl.
```
G09G 5/00      (2006.01)
G09G 5/02      (2006.01)
H04N 1/60      (2006.01)
G06T 11/00     (2006.01)
G06K 9/00      (2006.01)
G06K 9/40      (2006.01)
G06K 9/36      (2006.01)
```

(52) U.S. Cl.
CPC .............. *G06T 11/001* (2013.01); *H04N 1/60* (2013.01); *G09G 5/02* (2013.01)

(58) Field of Classification Search
CPC combination set(s) only.
See application file for complete search history.

(56) References Cited

U.S. PATENT DOCUMENTS

| | | | |
|---|---|---|---|
| 5,311,212 A | 5/1994 | Beretta | |
| 5,878,195 A * | 3/1999 | Mahy | 358/1.9 |
| 6,081,253 A | 6/2000 | Luke et al. | |
| 6,503,510 B2 * | 1/2003 | Koishihara et al. | 424/156.1 |
| 6,529,202 B2 | 3/2003 | Wu | |
| 6,632,093 B1 | 10/2003 | Rice et al. | |
| 6,870,544 B2 * | 3/2005 | Blanchard et al. | 345/589 |
| 7,069,193 B2 | 6/2006 | Brunt et al. | |
| 7,187,386 B2 | 3/2007 | Rice et al. | |
| 7,193,632 B2 | 3/2007 | Rice et al. | |
| 7,230,629 B2 | 6/2007 | Reynolds et al. | |
| 7,330,585 B2 | 2/2008 | Rice et al. | |
| 7,605,824 B2 | 10/2009 | Reynolds et al. | |
| 7,641,474 B2 | 1/2010 | Rice | |
| 2004/0212815 A1 * | 10/2004 | Heeman et al. | 358/1.9 |
| 2006/0087517 A1 * | 4/2006 | Mojsilovic | 345/593 |
| 2008/0062192 A1 * | 3/2008 | Voliter et al. | 345/591 |
| 2010/0194775 A1 | 8/2010 | Ou et al. | |
| 2010/0194776 A1 | 8/2010 | Chong et al. | |
| 2010/0195173 A1 * | 8/2010 | Dalrymple | 358/520 |

OTHER PUBLICATIONS

Lyons et al., Nine Tools for Generating Harmonious Colour Schemes, 2004, http://citeseerx.ist.psu.edu/viewdoc/summary?doi=10.1.1.97.2053, pp. 1-10.

(Continued)

*Primary Examiner* — Wesner Sajous
(74) *Attorney, Agent, or Firm* — The H.T. Than Law Group

(57) ABSTRACT

An expert color selection system that assists the user in selecting color combinations is disclosed. The expert system suggests combinations of colors that are harmonious with each other. The user may tune the level of harmony in the combination. The user may also select a color emotion for the color combination and set the emotion threshold. The suggested color combination can be used as interior or exterior paints and for color merchandise.

22 Claims, 13 Drawing Sheets

(56) References Cited

OTHER PUBLICATIONS

Ou et al. "A study of colour emotion and colour preference, Part I: colour emotions for single colours", Color Research and Application, vol. 29, No. 3, pp. 232-240, Jun. 2004, United Kingdom.

Ou et al., A Study of Colour Emotion and Colour Preference. Part II: Colour Emotions for Two-Colour Combinations. Color Research and Application. vol. 29, No. 4. pp. 292-298, Aug. 2004, United Kingdom.

Ou et al., "A Study of Colour Emotion and Colour Preference. Part III: Colour Preference Modeling". Color Research and Application. vol. 29, No. 5. pp. 381-389, Oct. 2004, United Kingdom.

Ou et al., "A colour harmony model for two-colour combinations", Color Research and Application, vol. 31, No. 3, pp. 191-204, Jun. 2006, United Kingdom.

Moon et al. "Area in Color Harmony", Journal of Optical Society of America, vol. 34, No. 2, pp. 93-103, Feb. 1944, Massachusetts.

Moon et al. "Aesthetic Measure Applied to Color Harmony", Journal of Optical Society of America, 34, No. 4, pp. 234-242, 1944, Massachusetts.

Moon et al. "Geometric formulation of classical color harmony", Journal of Optical Society of America, 34, No. 1, pp. 46-59 1944, Massachusetts.

EasyRGB-PC by Logicol S.r.l. (http://www.easyrgb.com/harmonies.php) Accessed on Apr. 16, 2013. 1 page.

Behr Virtual Color Centers by Behr for color exploration (http://www.behr.com/Behr/home#channel=EXPLORE;vgnextoid=8328ea6621ca5110VgnVCM1000008119fea9RCRD;view=26) Accessed on Apr. 16, 2013. 1 page.

Personal Color Viewer by Benjamin Moore & Co. (http://www.benjaminmoore.com/portals/bmps.portal?_nfpb=true&_br=1&_pageLabel=fh_home&np=public_site/articles/application_article/app_personal_color_viewer) Accessed on Apr. 16, 2013. 1 page.

ColorSmart by BEHR (http://www.behr.com/Behr/home#channel=EXPLORE; vgnextoid=8328ea6621ca5110=VgnVCM1000008119fea9RCRD;view=26) Accessed on Apr. 16, 2013. 1 page.

"Taylor Made Colour" by Imperial Chemical Industries PLC (http://www.dulux.ie/colours/tailormade.jsp) Accessed on Apr. 16, 2013. 1 page.

Colour Visualizer by Sherwin-Williams (https://www.sherwin-williams.com/visualizer/#) or (http://www.sherwin-williams.com/homeowners/color/try-on-colors/color-visualizer/) Accessed on Apr. 16, 2013. 1 page.

Virtual Painter by Valspar Corporation (http://www.valsparpaint.com/en/explore-colors/color-selector/#2) Accessed on Apr. 16, 2013. 1 page.

The Color Sense Game by Pittsburgh Paints (http://www.voiceofcolor.com/digital_color/color_sense_game) Accessed on Apr. 16, 2013. 1 page.

Goethe, J. W., "Theory of Colours. Translation by C. L. Eastlake (1840) from the German Farbenlehre" of 1810. Reprinted in 1970, Massachusetts: The MIT Press.

Chevreul, M. E., "The Principles of Harmony and Contrast of Colors". Translation by C. Martel (1854) from the French edition of 1839. Reprinted in 1981, New York: Van Nostrand Reinhold.

Foss, C. E., Nickerson, D. and Granville, W. C., "Analysis of the Ostwald color system", Journal of Optical Society of America, 34, 361-381 (1944).

Munsell, A. H., "A Grammar of Color". Edited and introduction by F. Birren from the original version of 1921. Reprinted in 1969, New York: Van Nostrand Reinhold.

Itten, J., "The Art of Color". Translation by Ernst van Haagen from German "Kunst der Farbe". New York: Van Nostrand Reinhold, 1961.

Ou, L.-C., Chong, P., Luo, M. R. and Minchew, C., "Additivity of Colour Harmony". Color Research & Application, n/a. doi: 10.1002/col.20624, Article first published online: Jun. 23, 2010.

Torgerson's Law of Categorical Judgment [Torgerson, W. S., "Theory and Methods of Scaling", John Wiley & Sons, New York, 1958].

Foss, Carl E. et al. "Analysis of the Ostwald Color System." Journal of the Optical Society of America. vol. 34, No. 7. Jul. 1944. pp. 361-381.

Extract of Eastlake, Charles Lock, et al. "Goethe's Theory of Colours." The M.I.T. Press. pp. 1-14. Found at http://www.compilerpress.ca/Competitiveness/Anno/Anno%20Goethe.htm.

\* cited by examiner

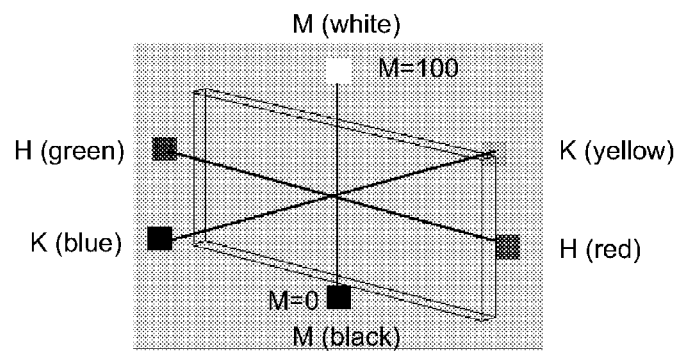
Figure 5A
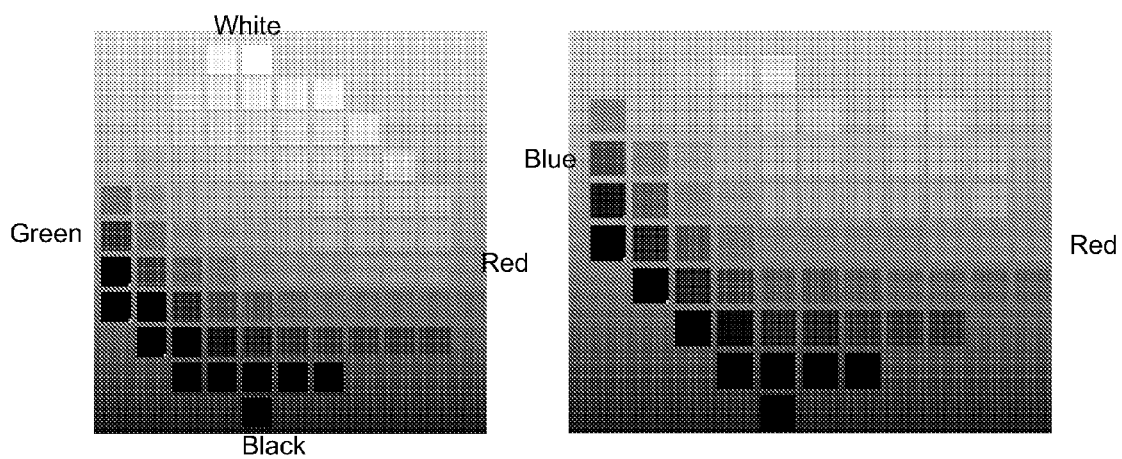
Figure 5B                    Figure 5C

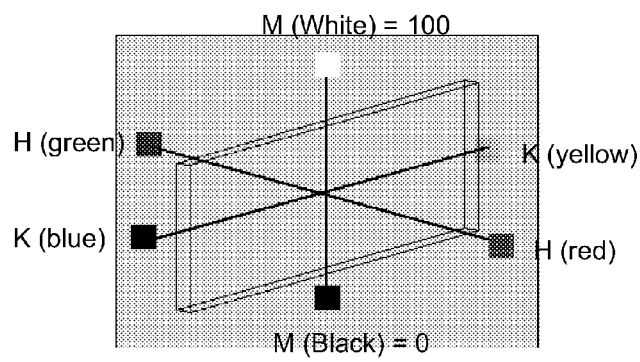
Figure 6A
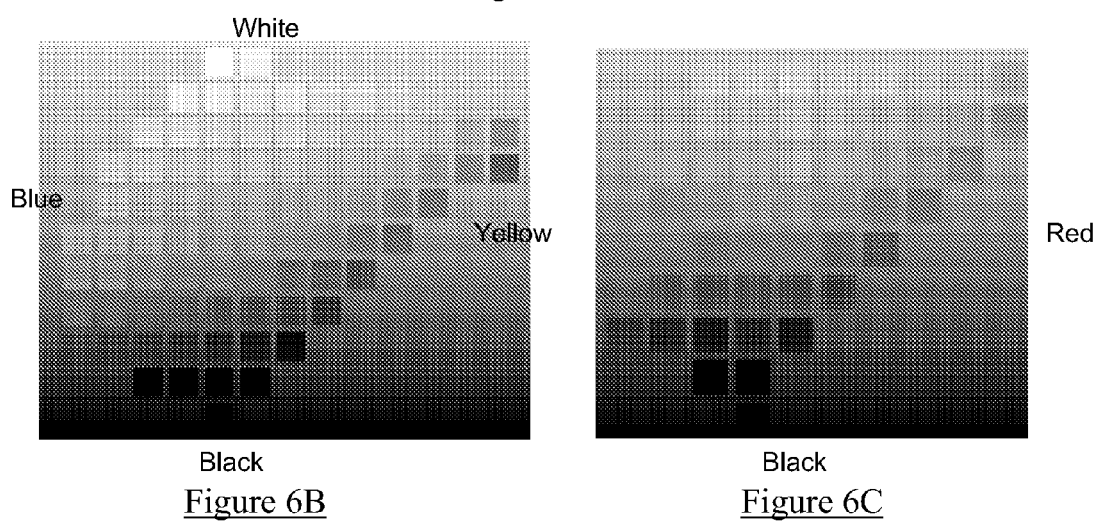
Figure 6B
Figure 6C

US 9,123,149 B2

EXPERT COLOR SYSTEM FOR COLOR SELECTION WITH COLOR HARMONY AND COLOR EMOTION INTELLIGENCE

FIELD OF THE INVENTION

This invention generally applies to a color selection system and more specifically to a color selection system with color harmony and color emotion intelligence.

BACKGROUND OF THE INVENTION

The present description relates to a color selection system for assisting the selection of color combinations.

Color selection tools are used in various sectors, including for example the paint industry, to assist consumers and professional designers in choosing appealing color combinations. The abundance of available color choices can make it challenging at times for both normal consumers and experienced designers to select appealing color combinations, even with the aid of existing color selection tools. Many existing color selection tools provide pre-existing recommended color combinations that were chosen by designers and experts.

The patent literature discloses color selection systems where coordinating colors are predetermined based on the first color selected by a user and based on a color coordination algorithm. The selections of colors recommended to users and consumers offered by these conventional color selection systems are limited.

Accordingly, there is a need for an on-the-fly color selection system that can provide consumers and other users color combinations that are harmonious and/or have the desired emotion threshold.

SUMMARY OF THE INVENTION

Hence, the invention is directed to an expert color selection system that assists the user in selecting a starting color, and in one embodiment without additional input from the user calculates one or more color combinations that are harmonious with the starting or selected color and/or provide desired color emotion threshold with the starting color.

Another aspect of the present invention relates to a development of novel uniform three-dimensional color spaces in Cartesian, polar and spherical coordinates. The color wheel theories are more accurately used with these novel uniform color coordinates. Another aspect of the present invention relates to transformations and inverse transformation among the three-dimensional color spaces including uniform and non-uniform spaces and including conventional color spaces and the novel uniform color spaces. These transformations and inverse transformations readily take colors from one space, e.g., CIE XYZ to Munsell and back or from CIELAB to a novel uniform color space and back. In one example, these transformations allow colors in any space be transformed to a space where color emotions and color harmonies can be calculated. Thereafter, harmonious colors and colors that meet emotional thresholds can be displayed.

Another aspect of the present invention relates to the quantization of the uniform color space into sub-spaces, which preferably are rectangular prisms or cuboids, where harmonious colors or colors that meet emotional thresholds may be included. The sub-spaces can include a color that the user selects, and additional sub-spaces are ascertained by rotating the first sub-space. The sub-spaces may not include the color that the user selects and the sub-spaces are the space surrounding color(s) that have a relationship with the color that the user selects based on color wheel theories applied to a uniform color space.

Another aspect of the present invention relates to a clustering process, where the analytical processes to determine harmonious color combinations or color combinations that meet color emotional thresholds are conducted on color combinations comprising the selected color and centers of cells or clusters within the quantized sub-spaces. The clustering process optimizes or minimizes the analytical processes to determine harmonious colors and/or colors that meet color emotion thresholds.

BRIEF DESCRIPTION OF THE DRAWINGS

In the accompanying drawings, which form a part of the specification and are to be read in conjunction therewith and in which like reference numerals are used to indicate like parts in the various views:

FIG. 5A shows a cuboid on the HM plane; FIG. 5B shows the available paint colors that are within the cuboid in FIG. 5A; FIG. 5C shows the paint colors within the cuboid after a rotation;

FIG. 6A shows a cuboid on the MK plane; FIG. 6B shows the available paint colors that are within the cuboid in FIG. 6A; FIG. 6C shows the paint colors within the cuboid after a rotation;

DETAILED DESCRIPTION OF THE PREFERRED EMBODIMENTS

Figure 1:
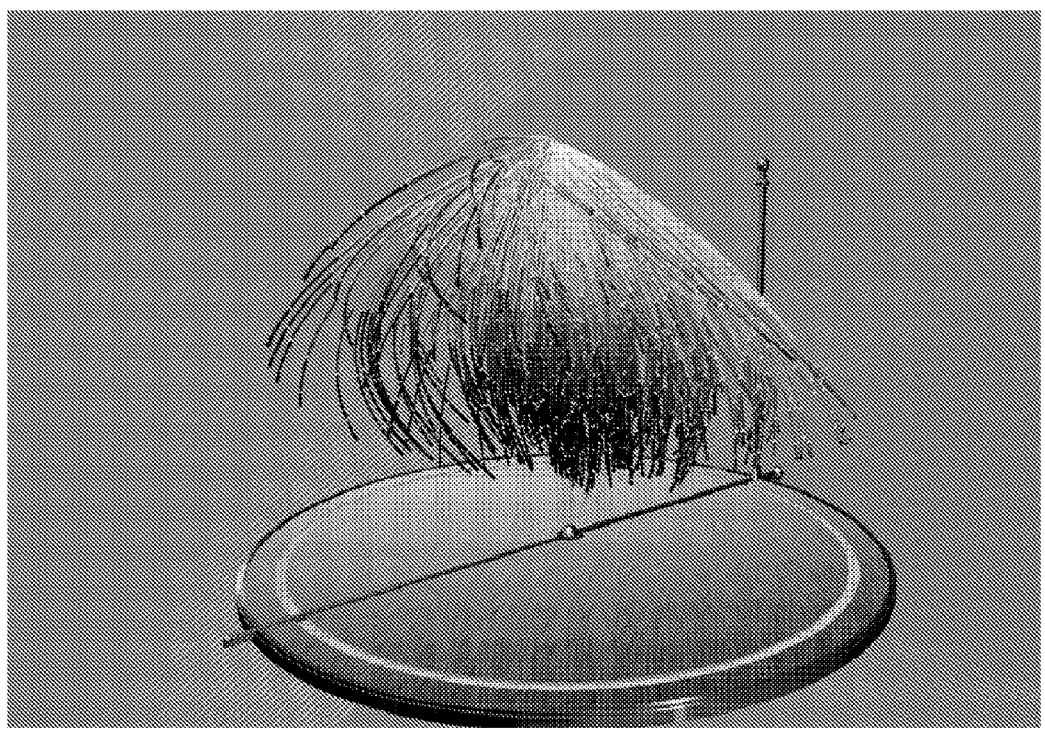
FIG. 1 is a schematic view showing the available paint colors in three-dimensional non-uniform space.

Producible colors can be represented in several ways, including by the intensities at the various wavelengths within the visible electromagnetic range. It is known that colors can be presented in a three dimensional space. It is also known that colors do not occupy all regions of the three-dimensional space. In other words, there are certain regions outside the gamut where no color exists. This is caused by the lack of pigments, among other things, that can be mixed to produce colors for those empty regions. FIG. 1 shows color merchandise or paint colors in the format of paint chips on color strips in a three dimensional space. For example, more lighter colors, where the lightness or value of the colors are closer to white, are available than darker colors, where the lightness of value of the colors are closer to black. Also more yellow colors are available than other colors. In addition to the uneven occupation of colors, the known three-dimensional color spaces are mostly non-uniform or have units that are cumbersome to perform analytical analysis, as described below.

An early three-dimensional coordinate was offered in 1931 by the Commission Internationale de l'Eclariage (CIE). This system defines three values also known as tristimulus values that can describe any color that human eye can perceive. These tri-stimulus values are $$X = k\int_\lambda S(\lambda) R(\lambda) \bar{x}(\lambda) d\lambda \quad (1)$$

$$Y = k\int_\lambda S(\lambda) R(\lambda) \bar{y}(\lambda) d\lambda \quad (2)$$

$$Z = k\int_\lambda S(\lambda) R(\lambda) \bar{z}(\lambda) d\lambda \quad (3)$$

where X, Y, and Z are the tristimulus values, k is a normalizing factor usually calculated as $$k = \frac{100}{\int_\lambda S(\lambda) \bar{y}(\lambda) d\lambda} \quad (4)$$

$S(\lambda)$ is the spectral concentration of the illumination on the specimen and $R(\lambda)$ the reflectance of the object being assessed for color. The $\bar{x}, \bar{y}, \bar{z}$ with the bars over them are the 1931 Standard Colorimetric Observer or the CIE 1931 Color Matching Functions. The CIEXYZ system is a Cartesian type of XYZ coordinate.

It is recognized that CIEXYZ is a non-uniform color space. Uniformity in a color coordinate system is the property that defines an equal notational difference in any two, or more, places in the space as being equally perceptible to an observer. This property is necessary to the establishment of color tolerances in any system. CIEXYZ was transformed in the mid-1970 to a more uniform system based on three Cartesian type coordinates: L*, a* and b* or CIELAB, which are at right angles to each other. L* designate lightness, a* designates redness-greenness and b* designates yellowness-blueness.

Since redness-greenness and yellowness-blueness axes are non-intuitive, CIELAB is converted to CIE L*C*h, which is a polar coordinate. L* still designates lightness, C* designates chroma and has the same units as a* and b*, and h° designates the hue angle. Lightness indicates the magnitude of the property of a reflecting object which nominates whether it appears to reflect more or less light incident upon it. Chroma indicates the amount of saturation of that color, e.g., the amount of purple in that purple color. Hue indicates the color and ranges from 0° at the red+ end of a* axis to 360°. Hue is the indication of color on the color wheel. CIE L*C*h or CIELCH is a polar system of coordinates.

Munsell is another color coordinate system developed circa 1915. The Munsell system comprises three attributes, which are hue, value (lightness), and chroma. The CIELCh system, which was developed after Munsell, has similar coordinates. The Munsell system expresses value (V) in terms of its relationship to CIEXYZ luminous intensity Y.

$$Y = 1.1914V - 0.22533V^2 + 0.23352V^3 - 0.0.20484V^4 + 0.00081939V^5 \quad (5)$$

This equation is often referred to as the Munsell 5th Order Function. Solving for Munsell's value yields:

$$V = 2.0583 Y^{1/2.736} - 1.0623 \quad (6)$$

The Munsell notation is unique in that Munsell chose a hue circle of 100 intervals which he designated by the five major hue notations R—for red
Y—for yellow
G—for green
B—for blue
P—for purple Combinations of these letter designations gave the intermediate, secondary (sometimes called binary) hues.

YR—for orange
GY—for greenish yellow
BG—for cyan
PB—for magenta
RP—for reddish purple Since there were 10 such hue designations, Munsell assigned 10 units of hue circle coverage to each letter combination; thus, obtaining 100 whole number hues from 1R all the way around to 10RP. These hue designations were combined with two other designators, an example of which might be the designation 5RP 8/10. Here the 8/represents a Value of 8 units and the /10 represents a Chroma of 10 units. When written alone Munsell Value designations are always followed by a slash character and Munsell Chroma designations are always preceded by a slash. The notation thus turns out to be Hue, Value and Chroma in that order, or H V/C.

CIEXYZ, CIELAB, CIELCH and Munsell are non-uniform color coordinate systems. An early uniform color coordinate system is the Ljg color coordinates from the Optical Society of America (OSA). The Ljg system has the lightness axis L with its zero at about 30% reflectance and ranges from about −5 (near black) to +7 (near white). The chromatic axes are j for yellowness-blueness and g for greenness-redness. The chromatic units range from about −7 to +7 depending on the hue angle and lightness of the gamut. These axes have their zero near neutral grey. It noteworthy that the greenness-redness axis is reverse from CIE's a* axis, and that Ljg is a large-scale color difference uniformity. Large-scale difference includes units that are five CIELAB units or larger.

In one embodiment of the present invention, a uniform color coordinate system is developed to transform the uniform Ljg system to a more usable uniform system MHK, which is another Cartesian system. The axis M is the lightness axis, while H is redness-greenness (similar to the a* of the CIELAB system) and K yellowness-blueness (similar to the b* of the CIELAB system). The transformation from Ljg to the more usable MHK is shown below.

$$M = 7.2L + 54$$

$$H = -7.2g$$

$$K = 7.2j$$

As shown, Ljg's reverse greenness-redness axis (g) has been re-orientated, and all three axes are scaled up by a factor of 7.2 to reduce the large scale factor and the lightness axis has been translated upward by 54 units. Hence, the M lightness axis now has its zero proximate near black.

The MHK color coordinate system can also be converted to a polar coordinate HuVC, where Hu is the hue angle, V is lightness and C is chroma. V, which ranges from 1 to 100, is different than Munsell's V, which ranges from 1 to 10. C has similar chroma units. The MHK color coordinate system can also be converted to a spherical coordinate UVW, where U is the length of a first line or vector from M=0 to the color, V is the angle from the HK plane to said first line and W is the angle on the HK plane and from the yellowness-blueness line K to a second line, wherein the second line is a perpendicular projection of the first line to the HK plane.

Figure 2:
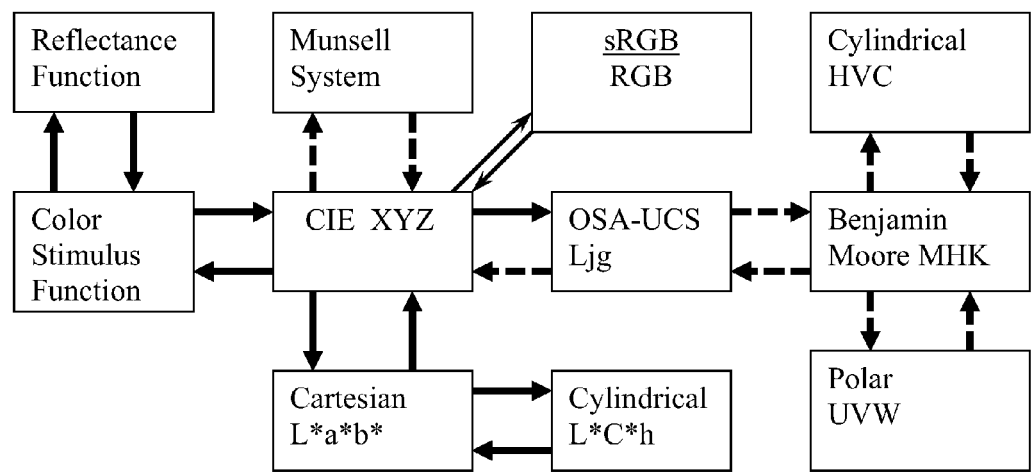
FIG. 2 is a block diagram showing the available color coordinate systems and the transformations and inverse transformation among them.

One aspect of the present invention relates to the conversion or transformation of color data from one color coordinate system to another and back again. As shown in FIG. 2, the color coordinate systems discussed above are shown along with the standard Red Green Blue (sRGB/RGB) color system used in televisions and computer monitors. Also shown are the known Reflectance Function, which comprises the reflections of visible light (380 nm-780 nm) from a surface, and the known Color Stimulus Function, which is the CIE color matching functions weighted by the spectral power distribution of the light illuminating the object, as discussed in ASTM E308. The CIEXYZ system is at the center of this transformation arrangement, where transformation and inverse (or reverse) transformation between CIEXYZ and each of Munsell, RGB, OSALjg, CIELCh, CIELab and Color Stimulus Function occur. The Reflectance Function is transformable with the Color Stimulus Function and is therefore transformable with CIEXYZ. Similarly, CIELCh is transformable with CIELab and is therefore transformable with CIEXYZ. The uniform HVC and UVW are transformable with the uniform MHK, which is transformable with OCALjg. Hence, MHK, HVC and UVW are also transformable with CIEXYZ. Solid arrow lines connecting the color coordinate systems indicate that the transformations and inverse transformations are previously known, and the broken arrow lines indicate that the transformations and inverse transformations are developed by the present inventors. Transformation and inverse transformation between CIEXYZ and Munsell were known only through table look-up, and analytical transformation and inverse transformation are developed by the present inventors.

As FIG. 2 clearly shows, color coordinates in any color coordinate system can be converted into any other color coordinate systems. Although not shown, the Cyan Magenta Yellow Black system (CMYK) or other systems typically used in color printers is also contemplated. Transformation and inverse transformation between RGB for computer monitors and CMYK and other color systems for computer printers are well known.

The analytical or mathematical transformations and inverse transformations are presented in the Appendix located at the end of this Section.

The novel uniform color coordinate systems are used in accurately coordinating or selecting colors using color wheel theories. For example, a user may need the colors that form a triad relationship to a chosen color. If the user uses a non-uniform color space in a simple two-dimensional color circle, then the triad colors, which should be located 120° from the chosen color, would be incorrectly selected. The same errors would occur in three-dimensional color spaces, as shown in FIG. 1, but with potentially larger error magnitudes, e.g., whether to keep the same lightness plane or to choose a parallel lightness plane or even a slanted plane with varying lightness. This holds true for other color wheel theories, such as, complementary, split complementary, mono-chromatic, analogous, tetradic, etc.

Another aspect of the present invention relates to transformations and inverse transformations among the three-dimensional color spaces including uniform and non-uniform spaces and including conventional color spaces and the novel uniform color spaces. These transformations and inverse transformations readily take colors from one space, e.g., CIE XYZ to Munsell and back or from CIELAB to a novel uniform color space and back. In one example, these transformations allow colors in any space be transformed to a space where color emotions and color harmonies based on psychophysical analytical models can be calculated. Thereafter, harmonious colors and/or colors that meet emotional thresholds can be displayed.

In accordance with another aspect of the present invention, a uniform three-dimensional color space, preferably the MHK coordinate system, is quantized into color subspace(s) or subregion(s) to enable the invention to focus at strategic location(s) in the entire color space and carry out color harmony and color emotion analysis. An advantage of quantization is to calculate color harmony and emotions more quickly. Color harmony and color emotions are preferably based on psychophysical responses of people to colors and color combinations, which are fully described in U.S. published patent applications US2010/0194775 and US2010/0194776, which are incorporated herein in their entireties. Color harmony of color combination and color emotions of colors are empirically determined based on human subjects' psychological responses to colors. These empirical observations were reduced to mathematical equations or mathematical functions expressed in terms $L^*$, $a^*$ and $b^*$ or $L^*$, $C^*$ and $h°$, and possibly CIEXYZ.

Figure 3:
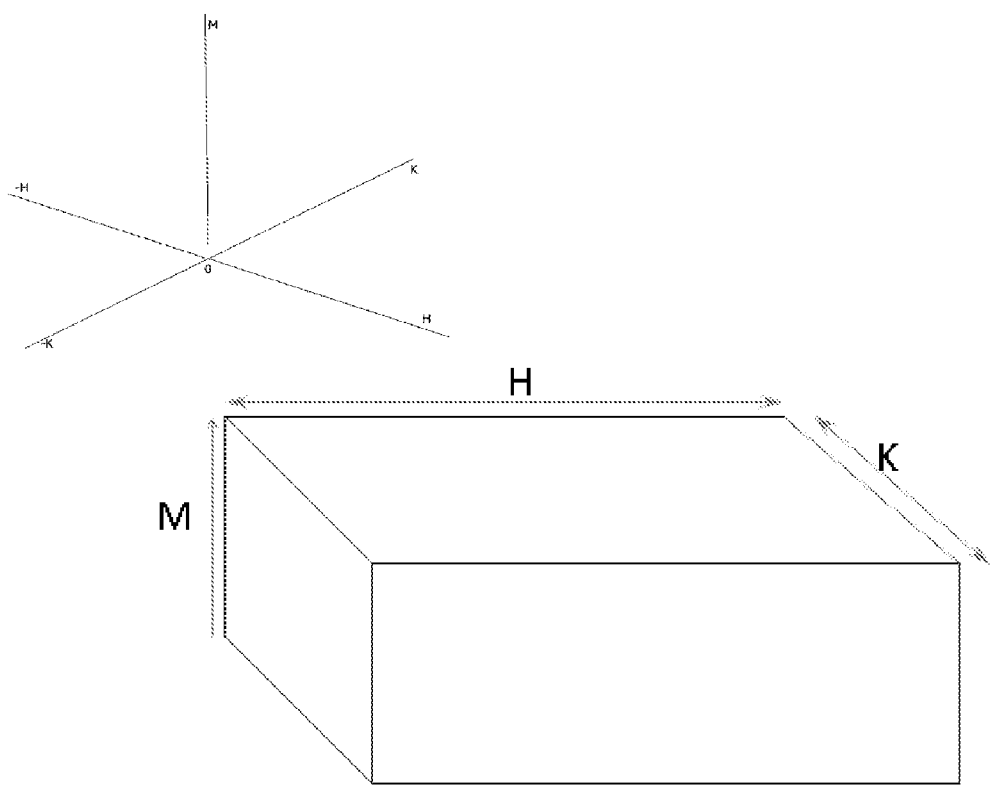
FIG. 3 shows an exemplary cuboid having dimensions in the M, H and K dimensions in the uniform MHK color space.

In one embodiment, the subspace is preferably a rectangular prism also known as a cuboid having dimensions in the directions M, H and K as shown in FIG. 3. It is noted that solid shapes other than cuboid are usable including regular and irregular shapes.

FIGS. 4A-6C illustrate the use of the cuboid to quantize, or to limit a variable or variables describing a physical system to discrete, distinct values. A relatively planar cuboid having a thickness or the smallest dimension sufficient to identify at least a single layer of colors is positioned at various orientations to illustrate the palettes that are within the cuboid.

Figure 4A:
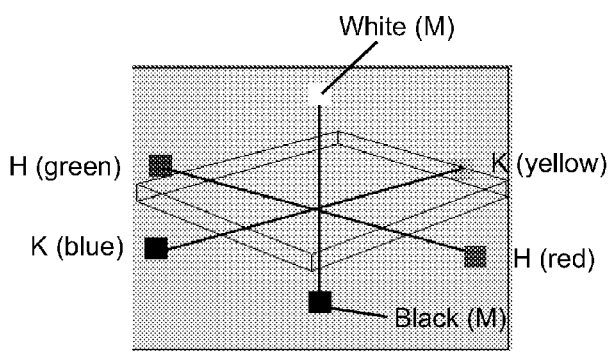
FIG. 4A shows a cuboid on the HK plane.
Figure 4B:
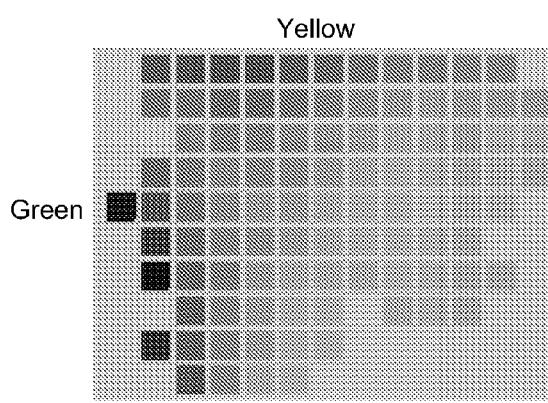
FIG. 4B shows the available paint colors that are within the cuboid in FIG. 4A.
Figure 4C:
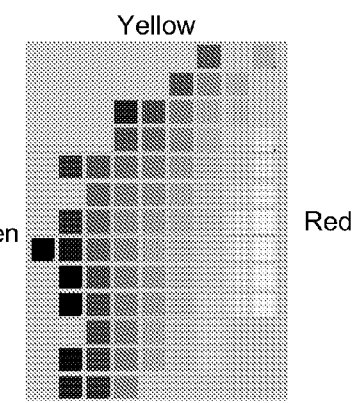
FIG. 4C shows the paint colors within the cuboid after a rotation.

FIG. 4A shows a horizontal cuboid along the HK plane and intersecting the M axis. FIG. 4B shows the paint colors that are located on the planar cuboid shown in FIG. 4A. This cuboid can be rotated about the K (yellow-blue) axis or the H (red-green) axis at M value of 50 (neutral gray) to obtain other colors. This cuboid can also be moved up and down the M axis for lighter or darker colors. FIG. 4C shows the colors obtained from a rotation of the cuboid in FIG. 4A about the K (yellow-blue) axis. The resulting colors include the red colors being lighter and the green colors being darker.

FIG. 5A shows a vertical cuboid along the MH plane and intersecting the K axis. FIG. 5B shows the paint colors that are located on the planar cuboid shown in FIG. 5A. This cuboid can be rotated and moved linearly to obtain other colors or bluer/yellower colors. FIG. 5C shows the colors obtained from a rotation of the cuboid in FIG. 5A about the H axis toward blue at M=0 and away from blue. The resulting colors include bluer whites and yellower blacks.

FIG. 6A shows a vertical cuboid along the MK plane and intersecting the H axis. FIG. 6B shows the paint colors that are available that are located on the planar cuboid in FIG. 6a. This cuboid can also be rotated and moved linearly to obtain other colors or redder/greener colors. FIG. 6C shows the colors obtained from a rotation around the K axis at M=0 to tip toward green.

The cuboids described above are used for at least two purposes: to identify suitable color subspace(s) using color wheel theories in a color palette or a color library, e.g., the various color libraries from Benjamin Moore or from any color palette, and after the suitable color subspace(s) are identified to rapidly execute color harmony and color emotion analysis.

Figure 7:
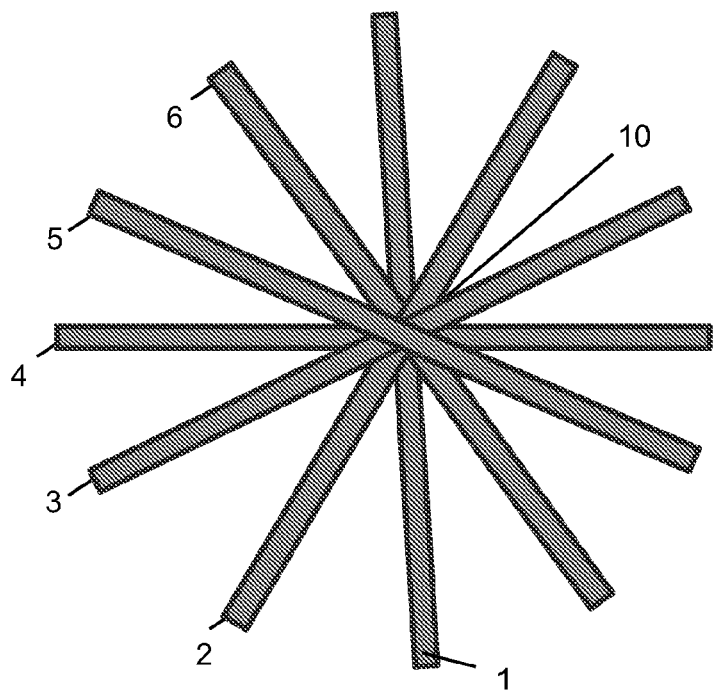
FIG. 7 shows a first cuboid that contains a color that a user selects and other cuboids formed by rotations of the first cuboid.

Suitable color subspaces or cuboids may include the color selected by the user, e.g., the first color or the selected color. In this embodiment, a cuboid having a predetermined size is centered vertically with the selected color from the user at its center, as shown in FIG. 5A or 6A. Additional cuboids 2-6 are created by rotating the first cuboid 1 around a vertical axis parallel to the M axis with the selected color 10 as the center of rotation or pivot point, as best shown in FIG. 7. Alternatively or additionally, additional cuboids 2-6 are created by rotating the first cuboid around the H axis or the K axis. These cuboids may have any dimensions and in one example the cuboids have a thickness of about 20 units (same unit as in the H and K axes). The cuboids' height and width are preferably limited to the color gamut limit of the color library used for color harmony analysis.

In another embodiment, the cuboid 1 can be centered horizontally with the selected color from the user at its center, as shown in FIG. 4A. Additional cuboids 2-6 are created by rotating the first cuboid 1 around a vertical axis parallel to the H axis or K axis with the selected color 10 as the center of rotation or pivot point.

Colors from within each rectangular cuboid 1-6 described in the two preceding paragraphs could potentially be a member of a color combination for color harmony analysis or color emotion analysis. Preferably, a single cuboid only contributes one color therewithin to a color combination for color harmony and color emotion analyses. These cuboids 1-6, as illustrated in FIG. 7, all contain the color selected by the user, e.g., the first color. As the number of cuboids increases, the number of combinations available for color harmony and color emotion analyses and the computational time increase faster by manifolds.

Suitable color subspaces or cuboids may not include the color selected by the user. This embodiment uses color circle theories, such as complementary, split complementary, mono-chromatic, analogous, triads, tetradic, etc. to identify suitable cuboids that do not necessary encompass the selected color or the first color. Color wheel theories also include combinations of colors that when combined yield a neutral gray. These color chords include dyads (two-color combinations), triads (three-color combination), tetrads (four-color combinations), hexads (six-color combinations), etc. The selected color is used as a guiding post or guiding compass and cuboids are selected in relation to the selected color based on color wheel theories.

It is noted that these known color wheel theories are based on the geometric relationship of colors in three dimensional space, but were often applied to non-uniform color space. Application of color wheel theories on non-uniform color space often yields unsatisfactory results or unharmonious colors. It is preferred that these color wheel theories are used on uniform color spaces such as the inventive MHK, HuVC and UVW, described above. It is further noted that instead of selecting individual colors that are suggested by the color wheel theories, when cuboids encompassing said individual colors are substituted for said individual colors the cuboids contains colors that may be more harmonious or that meet color emotion thresholds than the individual colors suggested by the color wheel theories. Furthermore, psychophysical analytical relationships for color emotions and color harmony are the applied to the possible combinations of colors in the cuboids suggested by color wheel theories to determine the optimum color combinations.

Figure 8:
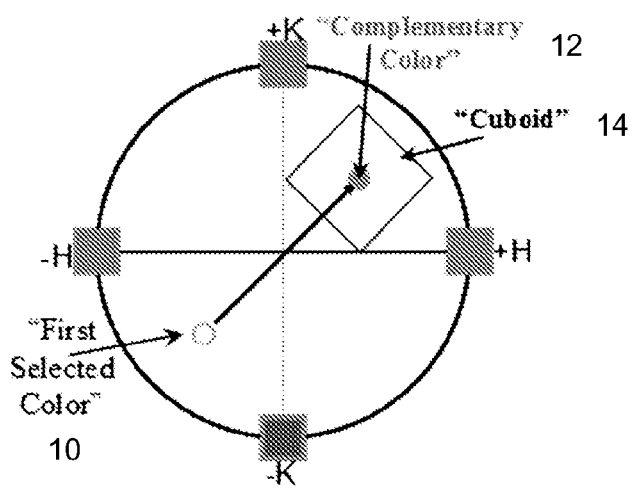
FIG. 8 shows a cuboid formed around a complementary color to the selected color.

Referring to FIG. 8, an example of an application of this method for a two-color combination is illustrated. A selected color or first color 10 is chosen in the MHK color space and more specifically on an HK plane. A complementary color 12 is located on the same plane or at the same M value or same lightness plane. Instead of using the complementary color, a cuboid 14 containing the complementary color 12 is selected as a possible palette or group of colors that can be harmonious or form optimal color emotion thresholds with the selected color as determined by psychophysical analytical models described in U.S. published patent applications US2010/0194775 and US2010/0194776. The complementary color 12 and cuboid 14 can be chosen on a different lightness plane, for example a certain M units above or below that of the selected color.

The complementary color 12 once chosen forms the center of the complementary cuboid 14, which as shown in FIG. 8, is preferably a rectangular box that is for example ±10 units in the M or lightness dimension and ±5 units in chroma and hue angles (in the cylindrical HuVC uniform system). The cuboid preferably has square sides in the chroma direction. The sides defining the hue limits of the boxes do not run along lines of equal hue angle, but along lines of equal Cartesian distance from the central line of constant hue angle. The dimensions of this box can vary. Preferably, this cuboid box has dimensions in the MHK dimensions and units. All colors from the color library that fall within this box are identified and retained for further calculations. In the event that there is no color in this cuboid box, the chroma can increase or decrease or the size of the box may increase, until the box is populated with colors.

Figure 9:
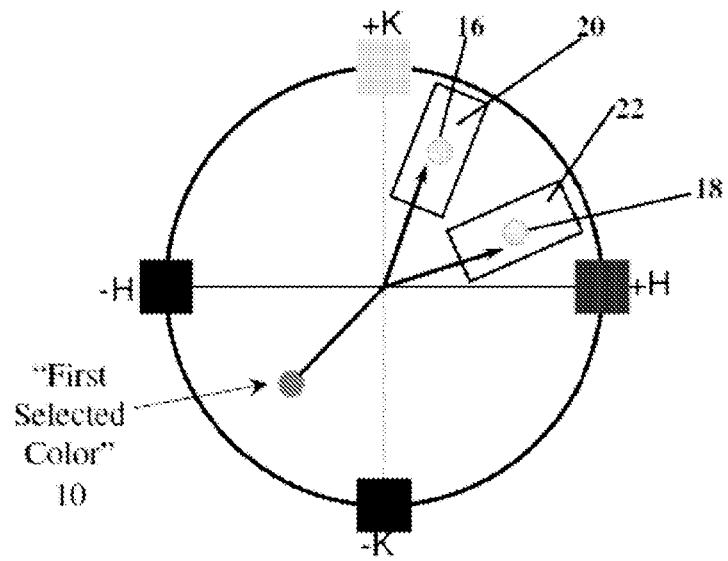
FIG. 9 shows two cuboids formed around two colors generated by color wheel theories in relation to the selected color.

Referring to FIG. 9, another example of an application of this method for a three-color combination is illustrated. A selected color or first color 10 is chosen in the MHK color space and more specifically on an HK plane that connects first color 10 and the center neutral point on the M axis. This HK plane is extended to opposite side of the circle. Two colors 16 and 18 that form a split complementary relationship with selected color 12, e.g., ±20° from the complementary color on this HK plane, are identified and cuboids 20 and 22 surrounding split complementary colors 16 and 18 using a predetermined ΔM, ΔH, ΔK values, respectively, are selected similar to cuboid 14. Colors in cuboids 20 and 22 are retained for analysis. Triad colors 16 and 18 may be located on the same M plane or may have a M value different than the M value of selected color 10.

Other ways to choose a three color combination with the selected color 10 and two cuboids include, but are not limited to split complementary or analogous harmony, i.e., chose two colors that have the same chroma and lightness but are at a small hue angle, e.g., ±3°-20°, from the complementary color, correlative harmony, i.e., the two analogous harmonious colors that are 20 units in the M axis darker or 10 units if the 20 units darker would result in M values of less than 0, and transverse harmony, i.e., similar to triads, split complementary, analogous harmony and correlative harmony, except that the second and third colors are equally darker than M=50 (mid-grey) of the gamut of the colors that are lighter by the equivalent amount.

Four color combinations, i.e., the selected color and three cuboids, can also be selected. Suitable color wheel theories for four color combinations include, but are not limited to, right hand tetradic harmony, i.e., the selected color, its complementary color, its analogous harmony color using a 30° hue angle on the right side using the complementary color as the chosen color, and the complementary of the right side analogous harmony, and left-hand tetradic harmony, i.e., similar to right-hand tetradic except a left side analogous harmony is used, Preferably, the four color combinations maintain the same lightness or value, and chroma.

Five color combinations can be ascertained by dividing the hue angles (360°) into 5 and six color combinations can be ascertained by dividing the hue angles into 6, with one color being the selected color. Any color combination can be devised.

After the cuboids 14, 20, 22 according to color wheel theories on a uniform color space are determined, an exhaustive psychophysical analysis including color harmony and color emotions can be conducted for every two-color combination of the selected color 10 and each color within cuboid 14, or for every three-color combination of the selected color 10, each color in cuboid 20 and each color in cuboid 22. The top combinations, e.g., the top 50 or so of the largest harmonious values and colors best meeting the emotion thresholds, are retained for possible display to the user in the order of color harmony preference. The top member of this list in terms of any desirable level of color harmony or color emotion is the candidate for display, if it is not a duplicate with one of the other colors in the harmony. If it is, the candidate color is the next member on the list until this condition does not exist.

It can be readily appreciate that for combinations of three colors, i.e., one selected color 10 and colors from two cuboids, and for combinations of N colors, i.e., one selected color 10 and colors from N−1 cuboids, the exhaustive method would require a very high amount of computation by a controller or processor. Another embodiment of the present invention relates to a clustering method, where the cuboid is divided into smaller cells or clusters to simplify the computation.

Figure 10:
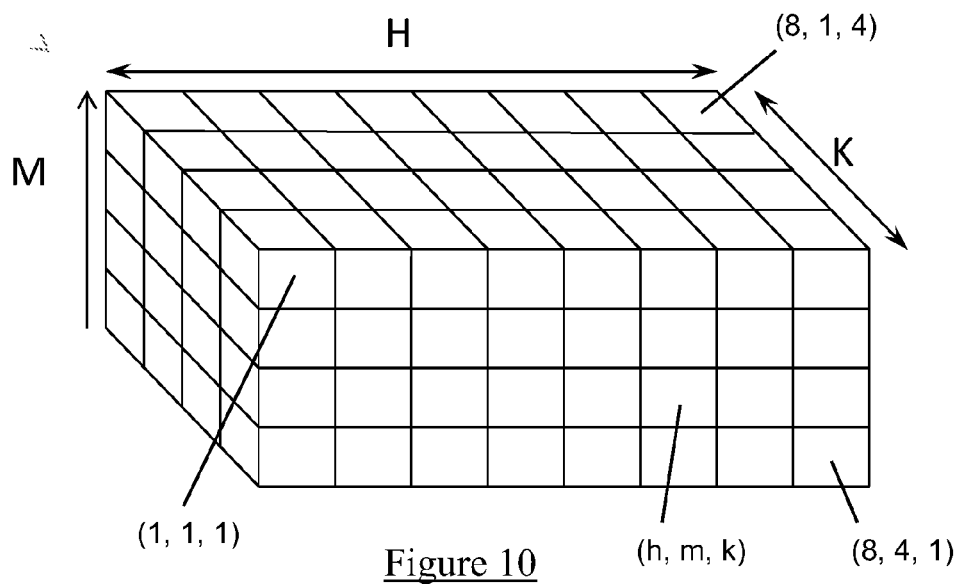
FIG. 10 shows a cuboid divided into clusters.

Referring to FIG. 10, a cuboid having the dimensions of M units by H units by K units is divided into cells or clusters. Each cluster has a three-coordinate designation (h, m, k) as shown.

The dimension of each cluster may vary and is preferably relatively large at the initial stage of the clustering process. For example, a cluster can be ±10 M units in lightness and ±5 five units at the H and K dimensions from the center of the cluster, as an initial choice. Because the MHK location of the first or selected color 10 is known and the dimensions of each cuboid encompassing the selected color 10 or each cuboid derived from color wheel theories are also known, the locations of each cluster's center in the MHK space are also known. The MHK values of each cluster's center are converted to the corresponding CIE parameters (L*, a*, b* or L*, C*, h) for color harmony analysis and color emotion analysis. As discussed above in U.S. published patent applications US2010/0194775 and US2010/0194776, color harmony of color combination and color emotions of colors are empirically determined based on human subjects' psychological responses to colors. These empirical observations were reduced to mathematical equations or mathematical functions expressed in terms L*, a* and b* or L*, C* and h. To use these psychophysical equations, the coordinates of selected color 10 and the centers of the cuboids' clusters are transformed or inversely transformed to CIELAB space, discussed above. Alternatively, these psychological equations or functions are re-derived in the MHK, HuVC or UVW uniform color spaces, so that the color harmony and emotion analysis can be conducted without utilizing CIELAB coordinate system or other non-uniform coordinate system.

Figure 11:
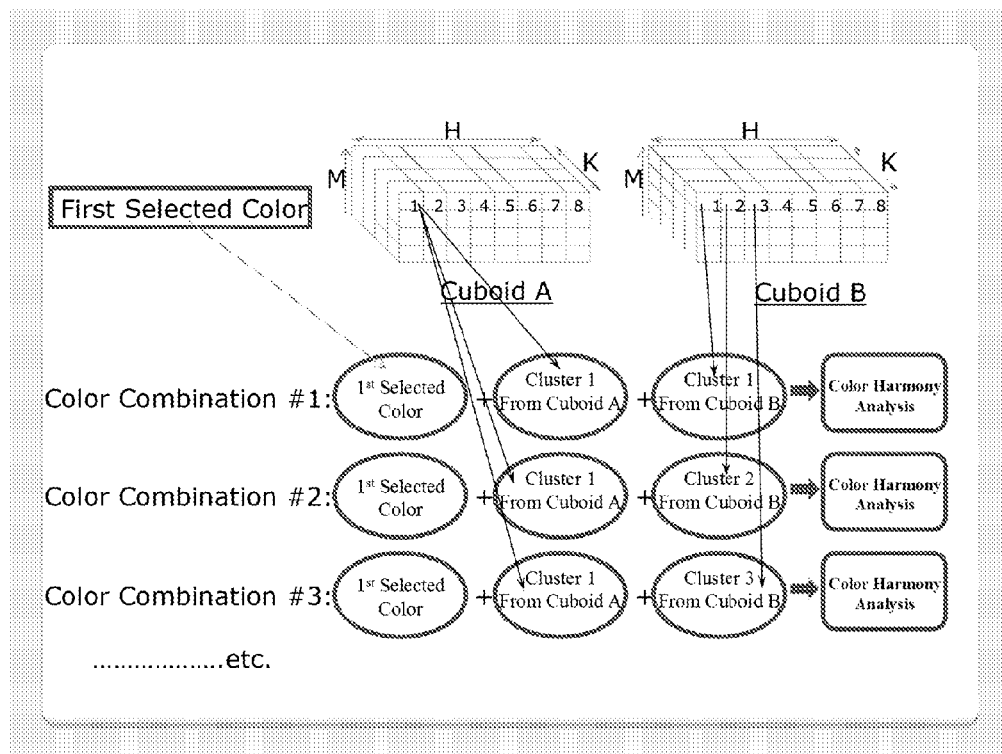
FIG. 11 shows a clustering process to ascertain color harmony for combinations including the selected color and the colors in two cuboids.

With respect to the color harmony of color combinations, at this initial stage exhaustive color combinations based on the "first selected color" and the "cluster centers" from each cuboid are formed and submit their respective CIELAB parameters for color harmony analysis to identify the best color harmony color combination. The best color harmony could be the color combination with high level of color harmony for pleasing color co-ordination, or the color combination with low level of color harmony where complementary color for accent is needed to create a sharp contrast. In other words, the amount or level of color harmony is tunable. This process is illustrated in FIG. 11. In the event a cuboid is identified that it does not encompass any color from the given color library, this cuboid will not be used in the analysis.

In one example, the cuboids are identified by rotating a cuboid that contains the selected color 10, as illustrated in FIG. 7, about the M axis by 30° each time to identify a total of 6 cuboids. There would be 20 unique four-color combinations with varying levels of color harmony after an exhaustive analysis is conducted with the selected color or first color 10 being in combination with three cluster centers.

| # of combinations | | Cuboid # | Cuboid # | Cuboid # |
|---|---|---|---|---|
| 1 | 1st Color | 1 | 2 | 3 |
| 2 | 1st Color | 1 | 2 | 4 |
| 3 | 1st Color | 1 | 2 | 5 |
| 4 | 1st Color | 1 | 2 | 6 |
| 5 | 1st Color | 1 | 3 | 4 |
| 6 | 1st Color | 1 | 3 | 5 |
| 7 | 1st Color | 1 | 3 | 6 |
| 8 | 1st Color | 1 | 4 | 5 |
| 9 | 1st Color | 1 | 4 | 6 |
| 10 | 1st Color | 1 | 5 | 6 |
| 11 | 1st Color | 2 | 3 | 4 |
| 12 | 1st Color | 2 | 3 | 5 |
| 13 | 1st Color | 2 | 3 | 6 |
| 14 | 1st Color | 2 | 4 | 5 |
| 15 | 1st Color | 2 | 4 | 6 |
| 16 | 1st Color | 3 | 4 | 5 |
| 17 | 1st Color | 3 | 4 | 6 |
| 18 | 1st Color | 4 | 5 | 6 |
| 19 | 1st Color | 5 | 6 | 2 |
| 20 | 1st Color | 5 | 6 | 3 |

Each cluster (h, m, k) may itself contain a number of colors. As discussed above, each cluster may have ±5 units in the H and K dimensions and ±10 M units in lightness dimension. The clustering process above would deliver the optimal harmonious color combination with the selected color 10 in combination with one or more cluster centers depending on the number of cuboids used. The clusters that are included in the optimal harmonious combination are known and are again subdivided into smaller cells or sub-clusters, similar to that shown in FIG. 10 and the process of calculating the color harmony for combinations comprising the selected color 10 and the centers of said cells or sub-clusters in said clusters is repeated until the process does not yield a combination with more optimal color harmony level.

After the combination of colors with optimal harmony level is ascertained, the MHK values of the centers of the selected clusters or sub-clusters are compared to the MHK values of actual paint colors in any given color library, e.g., Benjamin Moore's various color palettes and libraries. The actual paint colors having the smallest color difference from the centers of the selected clusters or sub-clusters are chosen as the colors for the combination to be displayed and suggested to the user.

Figure 12:
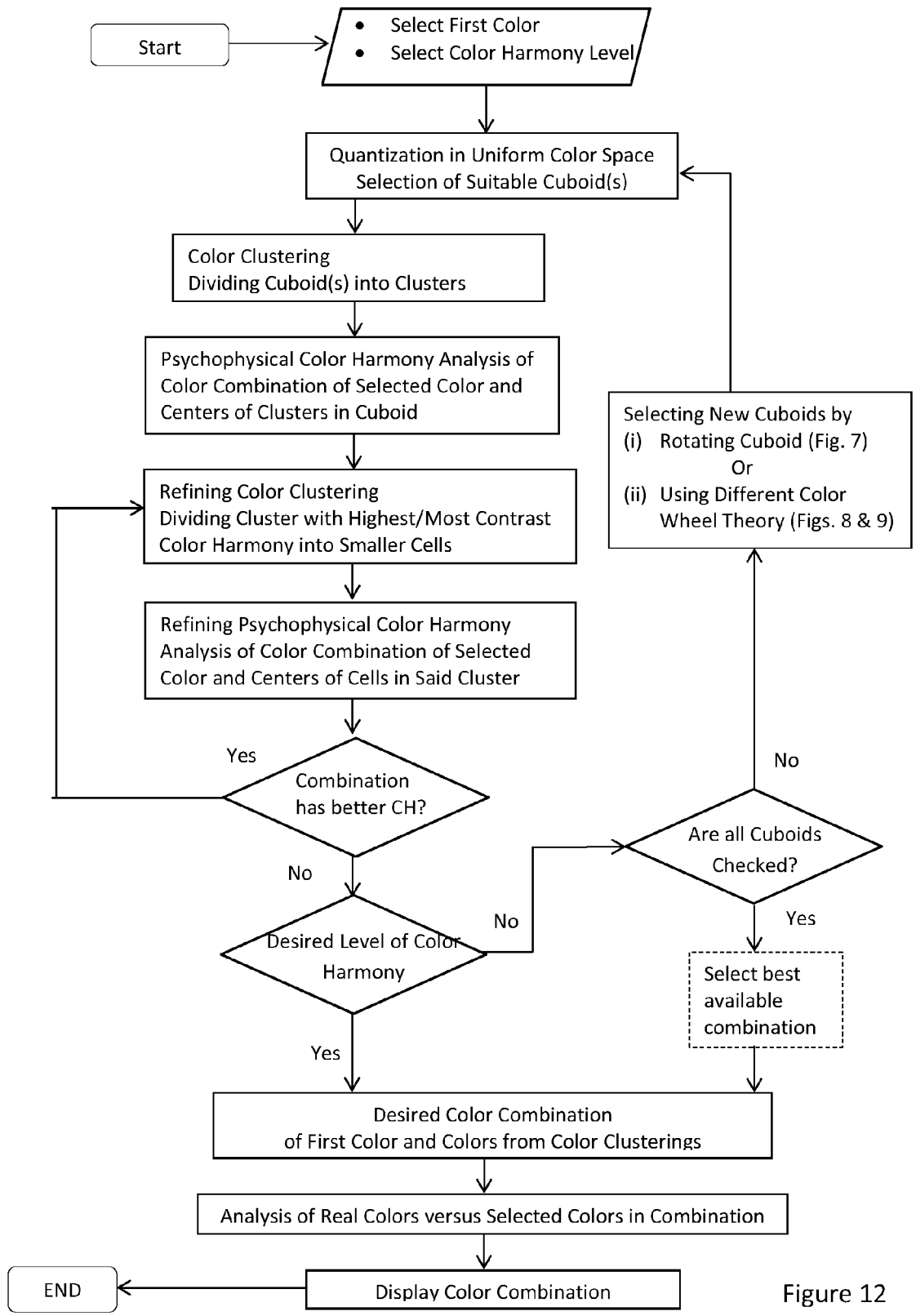
FIG. 12 shows a flow chart summarizing the steps for determining color harmony including the clustering process.

FIG. 12 shows a flow chart summarizing the clustering method for determining color harmony discussed above.

With respect to the color emotion(s) of color combinations, the clustering process is similar to that for color harmony. It is noted that color harmony indicates the harmonious property of a combination of colors, while color emotion(s) exists for a single color as well as an average or mean of the emotions of a combination of colors. While colors can evoke a wide variety of emotions in people, seven emotions have been identified as being material to paint colors, as discussed in U.S. published patent applications US2010/0194775 and US2010/0194776, as follows.

Figure 13:
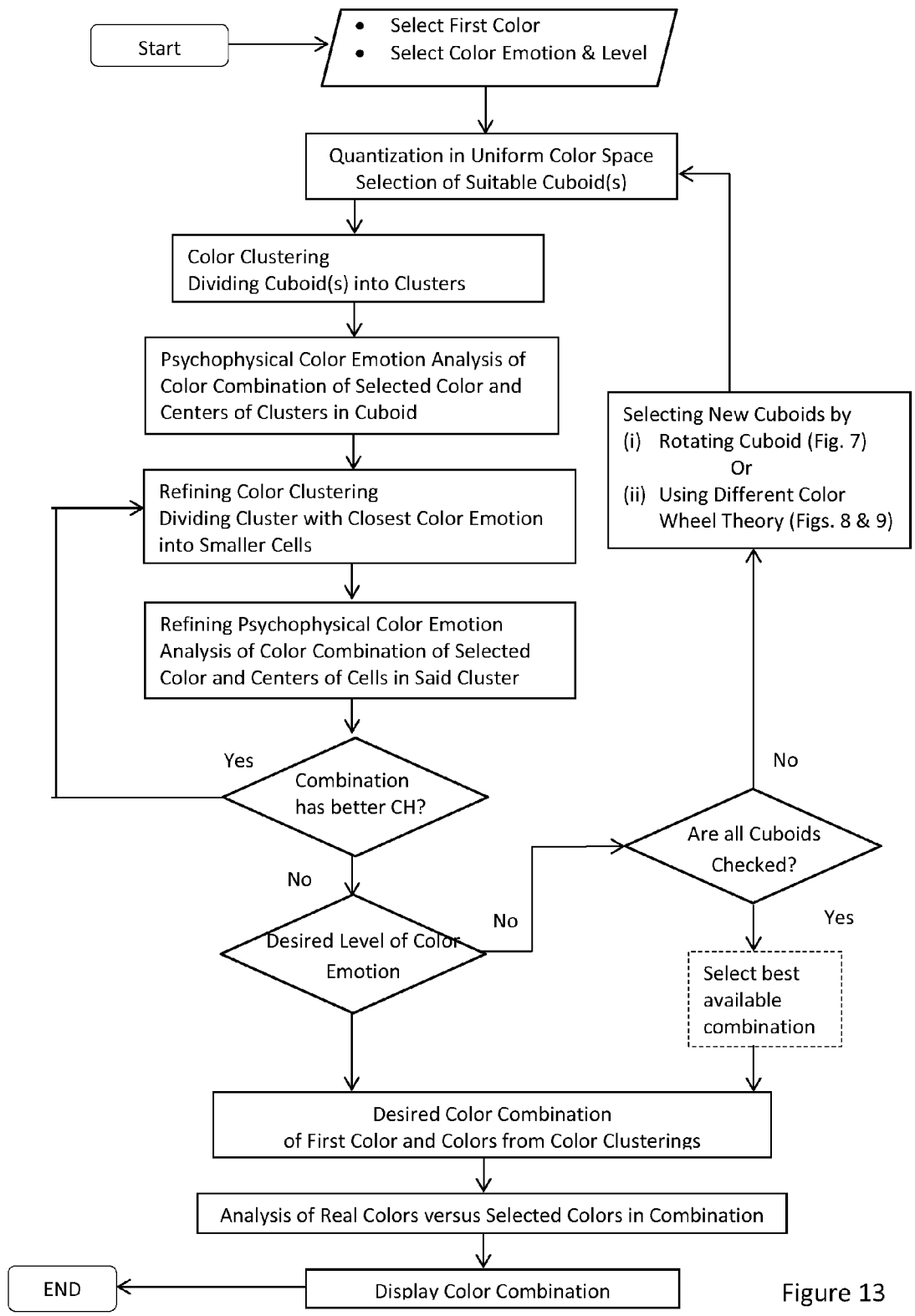
FIG. 13 shows a flow chart summarizing the steps for determining color emotion(s) including the clustering process.

(1) Exciting-calming:
exciting: causing great enthusiasm and eagerness
calming: making (someone) tranquil and quiet
(2) Inviting-uninviting:
inviting: offering the promise of an attractive or enjoyable experience
uninviting: unappealing; unattractive
(3) Warm-cool:
warm: of or at a fairly or comfortably high temperature
cool: of or at a fairly low temperature
(4) Light-dark:
light: having a considerable or sufficient amount of natural light
dark: with little or no light
(5) Clean-dirty:
clean: free from dirt, marks, or stains
dirty: covered or marked with an unclean substance
(6) Happy-depressing:
happy: feeling or showing pleasure or contentment
depressing: causing or resulting in a feeling of miserable dejection
(7) Fun-serious:
fun: amusing, entertaining, or enjoyable
serious: acting or speaking sincerely and in earnest, rather than in a joking or halfhearted manner The process to determine rapidly the desired color combination with the desired level of color emotion is similar to those used in the color harmony determination, discussed above, except that a desired color emotion and a desired threshold are input by the user, as well as the first or selected color 10. FIG. 13 shows the flow chart based on the desired color emotion threshold, the selection of color subspace, the color clustering process and the analysis of the selected color combination with the psychophysical color emotion equations. The evaluation can be applied to a single emotion or to maximize the result for multiple emotions.

Figure 14:
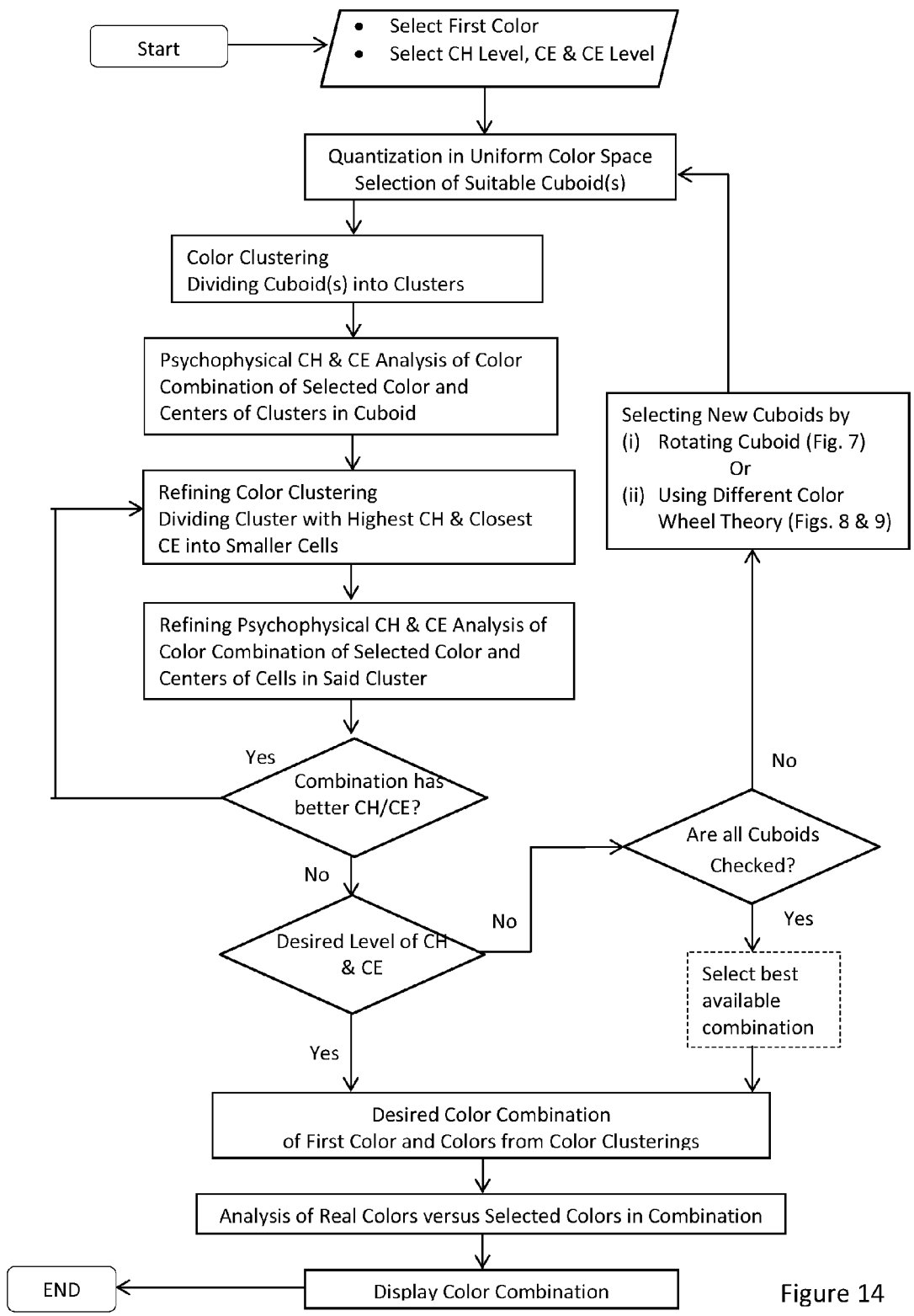
FIG. 14 shows a flow chart summarizing the steps for determining color harmony and color emotion(s) including the clustering process.

In another embodiment, both the color harmony and color emotion analyses can be combined into one process, as best illustrated in FIG. 14.

Figure 15:
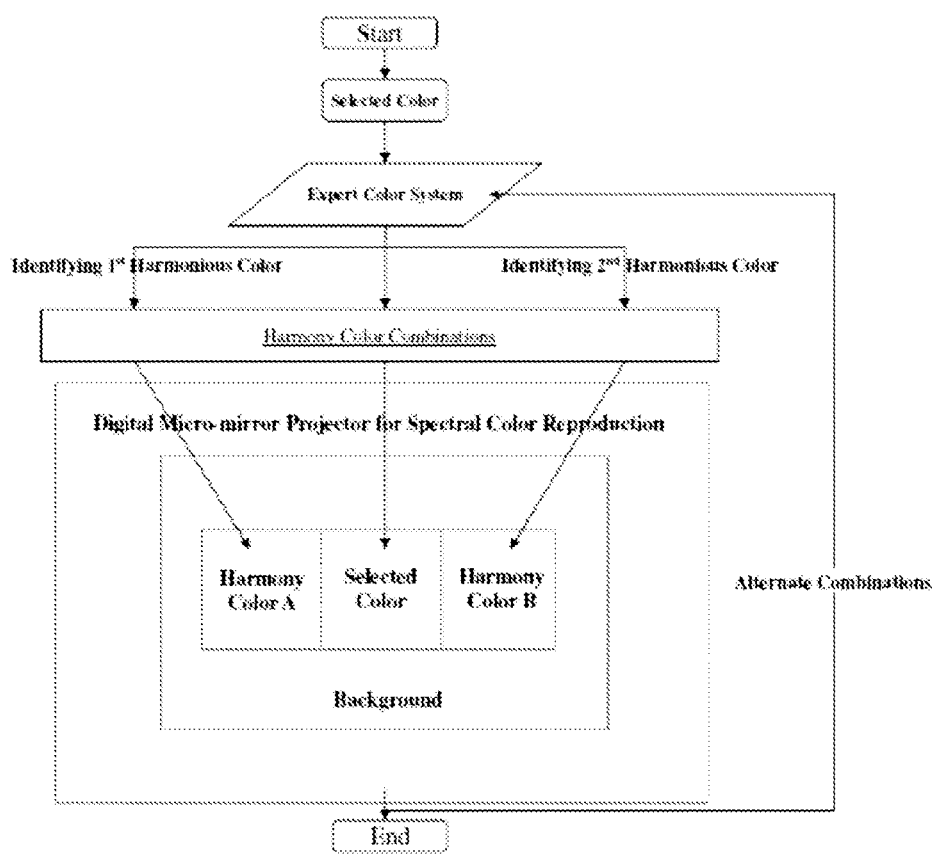
FIG. 15 shows a flow chart utilizing the present invention with a digital micro-mirror device to display the suggested color combination.

The color selection process of the present invention can be used in combination with printers that print low-metamerism paint samples or merchandise that closely match real paint colors. Such low-metameric merchandise are disclosed in commonly owned U.S. Pat. No. 8,330,999 and published patent application Publication Number US2010/0225935-A1, which are incorporated by reference herein in their entireties. The color selection process of the present invention can also be displayed on a screen or surface using digital micro mirror (DMM) devices. Such devices are disclosed in commonly owned U.S. patent application Ser. No. 13/325,900 entitled "System Producing True Colors Using a Digital Micromirror Device" filed on 14 Dec. 2011, which is incorporated by reference herein in its entirety, and can spectrally match the paint colors or color merchandise. FIG. 15 is an exemplary flow chart illustrating a non-limiting method of combining the inventive color selection process with DMM devices.

It is noted that the psychophysical analytical calculations to obtain color harmony and color emotions, as well as the transformations and inverse transformations among the color coordinate systems, are conducted on a computer or a device using a processor or controller. The interface with the user, including obtaining the first color or the selected color and displaying the suggested color combinations is carried out on a visual user interface, such as a computer monitor or tablet or screen, or on a printer. The first color can be inputted by its identification number on a keyboard, or scanned by a spectrophotometer, or be selected from a menu of color choices or from color palettes or libraries. The present invention is not limited by any particular method of inputting the first or selected color.

In another embodiment, the present invention is also directed to a computer system, including a processor, monitor and/or printer that operates or executes the processes and methods described and claimed herein.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

APPENDIX

Transformation and Inverse Transformation of Colors Among the Color Coordinate Systems Most of the following transformations are applicable to any CIE illuminant and observer combination. For those transformations that are illuminant and observer specific, the applicable illuminant and observer combination are specified.

Reflectance Function to Color Stimulus Function

Multiply the spectral reflectance function by the spectral power distribution of the selected illuminant or source.

$$Q(\lambda)=kS(\lambda)R(\lambda), \qquad (7)$$

where k is a scalar multiplier capable of normalizing the function appropriately, $S(\lambda)$ is the spectral power in the source and $R(\lambda)$ the reflectance function from spectrophotometry. The spectral power may be either relative or absolute, but see the following cautionary paragraph if you choose that it should be relative.

The scalar k will in most instances have a value of unity. In some cases, it may be useful to normalize the function at a particular wavelength, so that it can be compared to other similar functions. It may be useful to scale the color stimulus function so that when multiplied into the CIE color-matching functions the Y value is scaled to 100, as is the convention of the CIE system for object colors. Caution should be exercised in scaling color stimulus functions as once scaled, the action cannot be reversed without knowledge of the scaling coefficient used.

Color Stimulus Function to Reflectance Function

Divide the color stimulus function by the spectral power distribution of the selected illuminant or source in an inverse to equation (7).

Color Stimulus Function to CIE XYZ

Notice that Eq. (7) calculates the first factor of Eqs. (1-3). Thus the transformation of a color stimulus function to tristimulus values is covered in its entirety by Eqs. (1-4).

CIE XYZ to Reflectance Function

It is possible through Principal Component Analysis to transform from CIE tristimulus values back to reflectance functions even though this involves an expansion in the number of degrees of freedom from three for tristimulus values, e.g., to thirty-one (31) for a spectrum from 400 to 700 nm at 10 nm intervals. The methodology and data required for doing so is given in the literature. See H. S. Fairman and M. H. Brill, The Principal Components of Reflectances, *Color Research and Application*, 29, 104-110 (2004).

Using three principal components, if one has only one set of three tristimulus values known, it is possible to derive a spectrum that will have the exact tristimulus values in the reference illuminant and be not more than about 0.5 CIELAB color-difference units different in a second illuminant. If two sets of tristimulus values are known and used in connection with the first six principal components, the exact tristimulus values are guaranteed in both input illuminant-observer combinations, and the difference in a third illuminant combination may be no more than $0.2 \Delta E^*_{ab}$.

XYZ to Munsell

The details of the transformation are again beyond the scope of this document, but the method may be outlined as follows: tristimulus values are converted from the CIE system to an equivalent of the Adams Chromatic Value by the equivalent of Eq. (6). That should put the color space into a large-scale uniform framework. It does somewhat, but it was found then necessary to calculate a least-square best-fit regression equation relating these coordinates to the Munsell notations. This is done at many lightness levels and at many hue angles so that there is a multiplicity of regression coefficients applicable to a given location in the gamut.

The entirety of the methodology is included in the subroutine XYZ2Munsell which takes tristimulus values as its argument and returns Munsell notation as return values.

Munsell to XYZ

The traditional method of converting Munsell notation to CIE tristimulus values is a table look-up with interpolation of values not found exactly in the tables. Table for such look-up and interpolation are given in ASTM D1535 Practice for the Use of the Munsell System for Color, along with standard methods for their interpolation.

In order to make the transformation from Munsell to CIE tristimulus values under computer program control, it is suggested that the method described herein for converting from OSA-Ljg to tristimulus values, and given two sections below titled "Ljg to XYZ", be used. The forward transformation from XYZ to Munsell outlined in the section above would be used in place of the OSA forward transformation. Otherwise, the methodology of the Newton-Raphson method should be identical.

XYZ To Ljg

The tristimulus values involved are those of the CIE 1964 10° observer and CIE Standard Illuminant D65. The usual notation with the subscript 10 has been omitted in both the text and in the equations for clarity, but should be assumed in both.

Depending whether one is starting with tristimulus notation or chromaticity coordinate notation, some of the following equations will be used as both tristimulus and chromaticity notation will be required somewhere in the OSA equations.

$$x = \frac{X}{X+Y+Z} \quad (8)$$

$$y = \frac{Y}{X+Y+Z} \quad (9)$$

$$X = \frac{xY}{y} \quad (10)$$

$$Z = \frac{(1-x-y)Y}{y} \quad (11)$$

The path to transformation of CIE to OSA notation begins with the taking into account the chromatic enhancement of lightness. According to the Sanders-Wyszecki formula, a grey of tristimulus $Y_0$ appears equally light to a chromatic color with chromaticity coordinates x and y, and a luminous reflectance of Y.

$$Y_0 = (4.4934x^2 + 4.3034y^2 - 4.276xy - 1.3744x - 2.5643y + 1.8103)Y \quad (12)$$

The next effect to be considered is the crispening of color difference by backgrounds lighter or darker than the sample under consideration. A modified Semmelroth formula is used to model this effect, and a neutral grey background of 30% luminous reflectance is chosen as the standard background for viewing and calculating in the OSA system. The modified formula used is $$\Gamma = 5.9[Y_0^{1/3} - 2/3 + 0.042(Y_0 - 30)^{1/3}]. \quad (13)$$

A few intermediate values are then calculated. The scalar C will play a role similar to the scalar factors 500 and 200 in the CIELAB equation in order to keep the chroma scales uniform with each other over a wide range of lightness values.

$$C = \frac{\Gamma}{5.9(Y_0^{1/3} - 2/3)} = 1 + 0.042 \frac{(Y_0 - 30)^{1/3}}{Y_0^{1/3} - 2/3} \quad (14)$$

The primaries are now transformed to OSA primaries.

$$R = 0.799X + 0.4194Y - 0.1648Z$$

$$G = -0.4493X + 1.3265Y + 0.0927Z$$

$$B = -0.1149X + 0.3394Y + 0.717Z \quad (15)$$

Finally, the OSA notations themselves are calculated.

$$L = \frac{(\Gamma - 14.4)}{\sqrt{2}} \quad (16)$$

$$j = C(1.7R^{1/3} + 8G^{1/3} - 9.7B^{1/3})$$

$$g = C(-13.7R^{1/3} + 17.7G^{1/3} - 4B^{1/3})$$

The quantity L represents the lightness-darkness of the sample and the origin of the scale is, for every specimen, near the 30% luminous reflectance level. Accordingly, darker specimens will have negative L values and lighter specimens will have positive values. The name of scale j (from the French word jaune for yellow) was chosen to avoid confusion with CIE chromaticity coordinate y. Yellows are positive in j value and blues negative. Lastly, the scale g is reversed in direction from the usual so that greens are positive and reds negative in their g value. The order of OSA notation is always L, j, g, although that order is also unconventional.

Ljg to XYZ

For the inverse transformation, define the four functions of Eqs. (17-20) where the mathematical notation $f(\ )$ means the entire forward transformation of the paragraphs above from XYZ to Ljg notation.

$$(L_0, j_0, g_0) = f(X_i, Y_i, Z_i) \tag{17}$$

$$(L_1, j_1, g_1) = f(X_i + \Delta X, Y_i, Z_i) \tag{18}$$

$$(L_2, j_2, g_2) = f(X_i, Y_i + Y, Z_i) \tag{19}$$

$$(L_3, j_3, g_3) = f(X_i, Y_i, Z_i, \Delta Z) \tag{20}$$

An iterative algorithm is utilized. The i subscript in the right-hand-side of the above four equations refers to the current value in the $i^{th}$ iteration. In each iteration the transformation of the current values of CIE notation to Ljg notation are calculated; first, without modification, and then with an increment to X, and then Y and then to Z. This allows the calculation of the influence coefficients, or the influence matrix, needed for implementation of the Newton-Raphson method.

Two more items are needed to begin the iterative calculations. A good guess as to a nominal value for $X_0$, $Y_0$, and $Z_0$ in the opening iteration is required as is a well-chosen value for the size by which the tristimulus values will be incremented by selection of the magnitude of $\Delta X$, $\Delta Y$, and $\Delta Z$. The chosen values of both will affect the rate of convergence of the algorithm to the roots of the three simultaneous equations being solved in equation (21). These factors will be discussed in the next section.

$$\begin{bmatrix} X_{i+1} \\ Y_{i+1} \\ Z_{i+1} \end{bmatrix} = \begin{bmatrix} \frac{(L_1-L_0)}{\Delta X} & \frac{(L_2-L_0)}{\Delta Y} & \frac{(L_3-L_0)}{\Delta Z} \\ \frac{(j_1-j_0)}{\Delta X} & \frac{(j_2-j_0)}{\Delta Y} & \frac{(j_3-j_0)}{\Delta Z} \\ \frac{(g_1-g_0)}{\Delta X} & \frac{(g_2-g_0)}{\Delta Y} & \frac{(g_3-g_0)}{\Delta Z} \end{bmatrix}^{-1} \begin{bmatrix} L-L_0 \\ j-j_0 \\ g-g_0 \end{bmatrix} + \begin{bmatrix} X_i \\ Y_i \\ Z_i \end{bmatrix} \tag{21}$$

After each iteration, the calculated values of $X_{i+1}$, $Y_{i+1}$, and $Z_{i+1}$ are stored in a variable so that the rate of change in the XYZs may be assessed. When the change is diminishingly small to the user's need for accuracy the iterations are ended, and the values of XYZ, if put through the forward algorithm, will obtain the starting Ljg values.

Optionally, a limit to the maximum number of iterations should be imposed in the event that the algorithm should inadvertently fail to converge.

Comments and Observations

The present inventors' experience is that the values X=28.4, Y=30.0, and Z=32.2 are good starting values to be submitted to the first iteration. Those values are the tristimulus values of the central neutral grey of the OSA sample collection Ljg=(0,0,0), so would seem to offer the least difference in color with any random sample being converted.

The value recommended for $\Delta X = \Delta Y = \Delta Z$ is a value of 0.5. This increment should be chosen so as to coincide with the average difference by which tristimulus values are converging in each iteration.

In these calculations, it is preferred to slow the rate of convergence at the expense of many more iterations. Doing so will incur the cost of more inversions of the influence coefficient matrix which must be inverted once in each iteration. The incremental term (the right-hand-side of Eq. (21) before the plus sign) is divided by five plus the cube root of the iteration number before adding it to the tristimulus values from the previous iteration. This was done for two purposes. First, to slow the convergence so that, as the roots of the equations are approached, there is never an occasion where one, or more, tristimulus value overshoots the root. This can lead to returning to the exact same previous set of tristimulus values on the next iteration. That may put one in a never-exiting loop going back and forth over the roots forever. Secondly, the introduction of the small, but ever-changing, term the cube root of the iteration number prevents that possibility absolutely.

A good exit point exists when the rate of change of each of the three variables being sought has reached less than 0.0001 per iteration. One expects this to take about 150 to 200 iterations in a typical calculation with normal behavior. An upper limit of 600 iterations can be used before an abortive exit from the routine. Both of these may seem high compared to the number utilized in the other iterative process for computerized color matching with which the present inventors are most familiar. However, with the speed of modern day computers, it does not appear to slow the program down no matter how many colors are being processed, and the gain is more than worth the effort.

Users should be cautioned that the OSA equations themselves are only effective within the producible surface color gamut, and deteriorate rapidly from uniformity of color difference outside this gamut. In some operations that deal with the entire producible gamut, it is not easy to know whether one in or out of gamut. One should, however, make a determination as to the position of any color with respect to this gamut before submitting the color to conversion in either direction.

Ljg to MHK

The transformation of OSA values to the uniform MHK color coordinate system takes place through the following transforms:

$$M = 7.2L + 54 \tag{22}$$

$$H = -7.2g \tag{23}$$

$$K = 7.2j \tag{24}$$

MHK to HuVC

Figure 16:
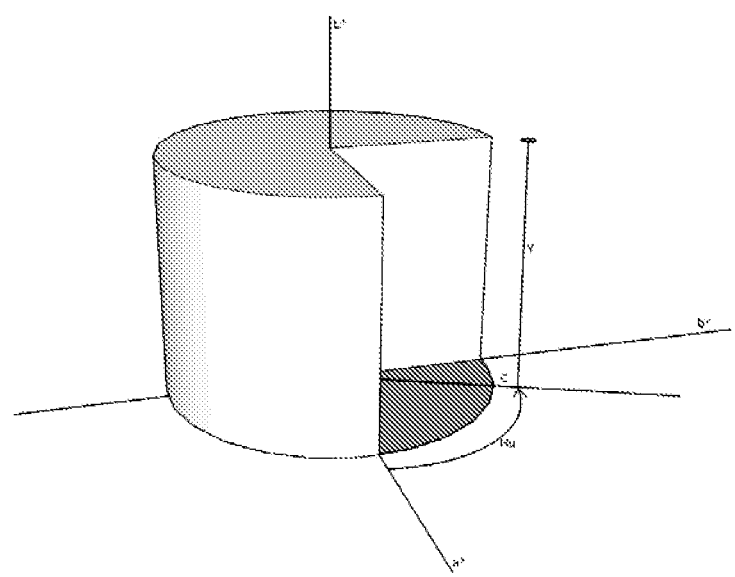
FIG. 16 shows the correlation between the Cartesian coordinate (L*, a*, and b*) and the polar coordinate (Hu, V, C).

The transformation of Cartesian coordinates (these equations would work as well for L*a* and b*) to hue, value, and chroma is accomplished by the following steps, as illustrated in FIG. 16.

Assign the value of $\pi$.

$$\pi = 4 * \text{Arctan}(1) \tag{25}$$

If K<>0 Then $$Hu = \pi - \text{Arctan}(H/K) - \pi/2 * \text{Sign}(K)) \tag{26}$$

Else $$Hu = \pi/2 - \pi/2 * \text{Sign}(H)$$

End If $$V = M \tag{27}$$

$$C = (H*H + K*K)^{1/2} \tag{28}$$

The function Sign( ) is a function built-in to most computer languages which return a minus one when the argument is negative, a zero when the argument is zero, and the value of positive one when the argument is positive.

These same equations will be given in a slightly different format in a section describing LAB to LCh coordinates appearing below.

MHK to UVW

To convert MHK to UVW follow the following sequence of transformations.

1) Dimension dummy variable XY(2) as placeholder and define Pi.

$$\text{Dim } XY(2)$$

$$PI = 4 * Atn(1) \tag{29}$$

2) Store M and H in a dummy variable XY(2) for arguments of Rect2Pol.

$$XY(0) = M$$

$$XY(1) = H \tag{30}$$

Call routine to convert Cartesian coordinates to polar coordinates (Rect2Pol)

$$\text{Rect2Pol } XY(\ ), UV(\ )$$

3) Save value of angle UV(1) in V1 and change variables for a second rectangular to polar in another plane $$V1 = UV(1)$$

$$XY(0) = UV(0)$$

$$XY(1) = MHK(0) \tag{31}$$

Call routine a second time to convert rectangular in another plane to polar.

$$\text{Rect2Pol } XY(\ ), UV(\ )$$

4) Save angle in U and test angle UV(1) for being greater than right angle; if so, correct.

$$U = UVW(0)$$

If $UVW(1) > PI/2$ then $$UV(1) = UV(1) - 2 * PI \tag{32}$$

End if $$W = PI/2 - UV(1)$$

$$V = V1$$

UVW to MHK

To transform back from UVW to MHK use:

$$M = U$$

$$H = U * \text{Cos}(V)$$

$$K = U * \text{Sin}(V) \tag{33}$$

HuVC to MHK

The transformations from HuVC to MHK is:

$$M = V$$

$$H = C \sin(Hu)$$

$$K = C \cos(Hu) \tag{34}$$

These equations are solved by the same subroutine used to convert LCh notation to L*a*b* notation with arguments sent to them in different notational format.

MHK to Ljg

The inverse transformation of MHK back to Ljg is accomplished by the following:

$$L = 0.1388889(M - 54) \tag{35}$$

$$j = 0.138889 K \tag{36}$$

$$g = -0.1388889 H \tag{37}$$

XYZ to Lab

The CIE proposed in 1976 the following transformation of tristimulus values to what was called the CIELAB System for Colorimetry. A definition of the transformation that has been rearranged for optimal implementation on a modern computer follows:

$$\text{Limit} = \left(\frac{6}{29}\right)^3 \tag{38}$$

If $X/Xn <= \text{Limit}$ then $$FuncX = \left(\frac{841}{108}\right)\left(\frac{X}{X_n}\right) + \left(\frac{4}{29}\right)$$

Else $$FuncX = \left(\frac{X}{X_n}\right)^3$$

End if
If Y/Yn<=Limit then $$FuncY = \left(\frac{841}{108}\right)\left(\frac{Y}{Y_n}\right) + \left(\frac{4}{29}\right)$$

Else $$FuncY = \left(\frac{Y}{Y_n}\right)^3 \tag{39}$$

End if
If Z/Zn<=Limit then $$FuncZ = \left(\frac{841}{108}\right)\left(\frac{Z}{Z_n}\right) + \left(\frac{4}{29}\right)$$

Else $$FuncZ = \left(\frac{Z}{Z_n}\right)^3$$

End if $$L^* = 116 FuncY - 16 \tag{40}$$

$$a^* = 500(FuncX - FuncY) \tag{41}$$

$$b^* = 200(FuncY - FuncZ) \tag{42}$$

These are the CIELAB coordinates $L^*$, $a^*$, $b^*$.

Lab to XYZ

CIELAB values may be transformed back to tristimulus values by the following equations:

$$X = Xn^* \text{Exp}(\text{Log}((L^*+16)/116 + a^*/500)^*3)$$

$$Y = Yn^* \text{Exp}(\text{Log}((L^*+16)/116)^*3)$$

$$Z = Zn^* \text{Exp}(\text{Log}((L^*+16)/116 - b^*/200)^*3). \tag{43}$$

The logarithms are natural logs and Exp stands for exponentiation.

Lab to LCh

CIELAB coordinates may be usefully transformed to cylindrical coordinates $L^*$, $C^*$, and h which stand for lightness, chroma, and hue angle, respectively.

$$L^* = L^* \tag{44}$$

$$C^* = [(a^*)^2 + (b^*)^2]^{1/2} \tag{45}$$

The value of h in degrees may be computed from the following pseudocode:
if $b^* = 0$ then $$h = 90 - 90 \text{sign}(a^*)$$

else $$h = 180 - (180/\pi)\tan^{-1}(a^*/b^*) - 90 \text{sign}(b^*)$$

end if where the function sign returns −1 for negative values of the argument, zero for zero value of the argument, and plus one for positive values. Such a function is built-in to almost all computer languages. π has a value of approximately 3.1415928. It may be useful to predefine the value of π in computer programs by $$\pi = 4 \tan^{-1}(1) \tag{46}$$

which stores the value of π to machine precision.

The coordinate h, hue angle in degrees, is not to be confused with the color-difference component $\Delta H^*$ which is the residual color-difference in the hue-change direction when the values of $\Delta E^*$, $\Delta L^*$, and $\Delta C^*$ are known $$\Delta H^* = (\Delta E^* - \Delta L^* - \Delta C^*)^{1/2} \tag{47}$$

There is no such thing as H* as a stand-alone parameter. Only $\Delta H^*$ is defined.

LCh to Lab

To get back to CIELAB values from LCh use the following:

$$L^* = L^* \tag{48}$$

$$a^* = C^* \sin(h) \tag{49}$$

$$b^* = C^* \cos(h) \tag{50}$$

$RGB_{sRGB}$ Values to CIE XYZ Values

CIE Standard Observer Used: 1931 two degree CIE standard observer
CIE Standard Illuminant Used: CIE standard illuminant D65

$$\begin{bmatrix} R_{sRGB} \\ G_{sRGB} \\ B_{sRGB} \end{bmatrix} = \begin{bmatrix} 3,2406 & -1,5372 & -0,4986 \\ -0,9689 & 1,8758 & 0,0415 \\ 0,0557 & -0,2040 & 1,0570 \end{bmatrix} \begin{bmatrix} X \\ Y \\ Z \end{bmatrix}$$

Where $R_{sRGB}$, $G_{sRGB}$, $B_{sRGB}$ are functions of the corresponding 8 bit RGB values and are defined in the International Electrotechnical Commission document IEC/4WD 61966-2-1 "Colour Measurement and Management in Multimedia Systems and Equipment—Part 2-1: Default RGB Colour Space—sRGB.

CIE XYZ Values to $RGB_{sRGB}$ Values

CIE Standard Observer Used: 1931 two degree CIE standard observer
CIE Standard Illuminant Used: CIE standard illuminant D65

$$\begin{bmatrix} X \\ Y \\ Z \end{bmatrix} = \begin{bmatrix} 0,4124 & 0,3576 & 0,1805 \\ 0,2126 & 0,7152 & 0,0722 \\ 0,0193 & 0,1192 & 0,9505 \end{bmatrix} \begin{bmatrix} R_{sRGB} \\ G_{sRGB} \\ B_{sRGB} \end{bmatrix}$$

We claim:
1. A method for selecting a combination of colors comprising the steps of
   (a) receiving a first color;
   (b) locating said first color in a uniform three-dimensional color space, wherein said uniform three-dimensional color space is the property that defines an equal notational difference in any two, or more, places in said color space as being equally perceptible to an observer;

(c) quantizing said uniform color space into at least a first sub-space;

(d) calculating using a processor a psychophysical property of combinations of colors, wherein each combination comprises the first color and at least a color from the at least first sub-space;

(e) displaying on a visual user interface a suggested combination of colors, which include the first color.

2. The method of claim 1, wherein the at least first sub-space includes the first color.

3. The method of claim 2, wherein at least one additional sub-space is ascertained by rotating the at least first sub-space about an axis through the first color.

4. The method of claim 3, wherein the axis is parallel to a lightness axis.

5. The method of claim 3, wherein the axis is a chroma axis.

6. The method of claim 1, wherein the at least first sub-space excludes the first color.

7. The method of claim 6, wherein the at least first sub-space includes a related color, wherein the related color relates to the first color by a color wheel relationship.

8. The method of claim 7, wherein the related color comprises a center of the at least first sub-space.

9. The method of claim 7, wherein the color wheel theory comprises a complementary, a split complementary, monochromatic, analogous, triad, tetradic, five-way or six-way relationship with the first color.

10. The method of claim 7, wherein at least one additional sub-space is ascertained to include a second related color, wherein the second related color relates to the first color by a color wheel relationship.

11. The method of claim 1, wherein the uniform three-dimensional color space comprises a lightness axis ranges from about 0 to about 100 lightness units.

12. The method of claim 1, wherein the sub-space is a cuboid.

13. The method of claim 1, wherein further comprising the step of dividing the at least first sub-space into clusters.

14. The method of claim 1, wherein the psychological property comprises a color harmony or a color emotion.

15. The method of claim 1, in step (d) the colors in the combinations are transformed to a non-uniform color space.

16. A method for selecting a combination of colors comprising the steps of (a) receiving a first color;

(b) locating said first color in a uniform three-dimensional color space;

(c) quantizing said uniform color space into at least a first sub-space and dividing the at least first sub-space into clusters;

(d) calculating using a processor a psychophysical property of combinations of colors, wherein each combination comprises the first color and at least a color from the at least first sub-space; wherein in step (d) the combinations of colors include the first color and a color from each cluster; and (e) displaying on a visual user interface a suggested combination of colors, which include the first color.

17. The method of claim 16, wherein a selected cluster is further divided into cells and the combinations of colors include the first color and a color from each cell.

18. The method of claim 17, wherein the selected cluster is a cluster having an optimal psychophysical property.

19. A method for processing colors to suggest a combination of colors comprising the steps of (a) receiving a first color;

(b) locating said first color in a three-dimensional color space;

(c) quantizing said color space into at least a first sub-space;

(d) dividing the at least first sub-space into clusters (e) calculating using a processor a property of groups of colors, wherein each group includes the first color and a color from the clusters;

(f) further dividing a selected cluster into cells;

(g) calculating using the processor said property of second groups of colors, wherein each second group includes the first color and a color from the cells;

(e) displaying on a visual user interface the suggested combination of colors, which include the first color.

20. The method of claim 19, wherein the three-dimensional color space is uniform.

21. The method of claim 19, wherein said property comprise a psychophysical property.

22. The method of claim 19, wherein if a value of said property from step (g) is improved from a prior value, repeat steps (f) and (g) with a selected cell being the selected cluster.

* * * * *